(12) United States Patent
Nomura et al.

(10) Patent No.: US 12,399,315 B2
(45) Date of Patent: Aug. 26, 2025

(54) METHOD OF MANUFACTURING OPTICAL FIBER AND OPTICAL-FIBER-MANUFACTURING APPARATUS

(71) Applicant: SUMITOMO ELECTRIC INDUSTRIES, LTD., Osaka (JP)

(72) Inventors: Takahiro Nomura, Osaka (JP); Kazuyuki Sohma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 434 days.

(21) Appl. No.: 17/854,593

(22) Filed: Jun. 30, 2022

(65) Prior Publication Data

US 2023/0012431 A1   Jan. 12, 2023

(30) Foreign Application Priority Data

Jul. 2, 2021   (JP) ................................. 2021-110761

(51) Int. Cl.
| | |
|---|---|
| *G02B 6/02* | (2006.01) |
| *C03C 25/105* | (2018.01) |
| *C03C 25/285* | (2018.01) |
| *C03C 25/326* | (2018.01) |
| *C03C 25/6226* | (2018.01) |

(52) U.S. Cl.
CPC ........ *G02B 6/02395* (2013.01); *C03C 25/105* (2013.01); *C03C 25/285* (2013.01); *C03C 25/326* (2013.01); *C03C 25/6226* (2013.01); *C03C 2218/32* (2013.01)

(58) Field of Classification Search
CPC . G02B 6/02395; C03C 25/105; C03C 25/285; C03C 25/326; C03C 25/6226; C03C 2218/32
See application file for complete search history.

(56) References Cited

U.S. PATENT DOCUMENTS

| | | | | |
|---|---|---|---|---|
| 4,962,992 A | * | 10/1990 | Chapin ................ | G02B 6/4457 385/102 |
| 5,147,433 A | * | 9/1992 | Petisce ................... | G02B 6/443 65/435 |
| 5,219,623 A | * | 6/1993 | Petisce ................... | B29C 35/14 427/508 |

(Continued)

FOREIGN PATENT DOCUMENTS

| | | |
|---|---|---|
| JP | 2010-117527 A | 5/2010 |
| JP | 2018-135465 A | 8/2018 |

(Continued)

*Primary Examiner* — Peter Radkowski
(74) *Attorney, Agent, or Firm* — Faegre Drinker Biddle & Reath LLP

(57) ABSTRACT

A method of manufacturing an optical fiber includes applying a curable resin composition containing a photopolymerization initiator so that an outer circumference of a glass fiber including a core and a cladding is coated, and forming a coating layer by radiating an ultraviolet ray to the curable resin composition and curing the curable resin composition. Forming the coating layer includes providing two or more non-radiation periods and intermittently radiating the ultraviolet ray three or more times so that a total time of the non-radiation periods is 0.010 seconds or more.

4 Claims, 3 Drawing Sheets

(56) References Cited

U.S. PATENT DOCUMENTS

| | | | | |
|---|---|---|---|---|
| 5,845,034 | A | * | 12/1998 | Petisce .................. C03C 25/106 385/128 |
| 5,958,584 | A | * | 9/1999 | Petisce .................... C03C 25/10 385/115 |
| 6,173,102 | B1 | * | 1/2001 | Suzuki ................ C03C 25/1065 385/128 |
| 6,181,859 | B1 | * | 1/2001 | Suzuki ................ C03C 25/1065 385/128 |
| 6,628,875 | B2 | * | 9/2003 | Baker ................ C03C 25/1065 385/128 |
| 7,067,564 | B2 | * | 6/2006 | Bulters ................ C08G 18/672 427/508 |
| 7,706,659 | B2 | * | 4/2010 | Bulters .............. G02B 6/02395 522/182 |
| 7,865,055 | B2 | * | 1/2011 | Bulters ................ C03C 25/1065 522/182 |
| 7,886,612 | B2 | * | 2/2011 | Bulters ................ C03C 25/1065 73/826 |
| 7,906,566 | B2 | * | 3/2011 | Sugimoto .......... C08G 18/4854 524/556 |
| 8,406,596 | B2 | * | 3/2013 | Chien ................ G02B 6/02395 385/128 |
| 8,857,221 | B2 | * | 10/2014 | Okada .............. C03B 37/02745 65/402 |
| 9,096,464 | B2 | * | 8/2015 | Okada ................. C03C 25/1065 |
| 9,868,796 | B2 | * | 1/2018 | Ashikaga .................. B05D 7/04 |
| 9,878,935 | B2 | * | 1/2018 | Okada ................. C03B 37/0253 |
| 10,023,490 | B2 | * | 7/2018 | Okada .............. C03B 37/02718 |
| 10,273,316 | B2 | * | 4/2019 | Ashikaga .................. C08F 2/01 |
| 10,570,051 | B2 | * | 2/2020 | Okada .................. C03C 25/106 |
| 10,745,314 | B2 | * | 8/2020 | Okada ..................... C03B 37/03 |
| 11,407,682 | B2 | * | 8/2022 | Bookbinder ............ C03C 13/04 |
| 2002/106173 | A1 | * | 8/2002 | Stupak ................ C03C 25/1065 385/128 |
| 2002/0146225 | A1 | * | 10/2002 | Bulters .............. C08G 18/8175 385/125 |
| 2003/0051511 | A1 | * | 3/2003 | Suzuki .................... C03B 37/03 65/432 |
| 2003/0059188 | A1 | * | 3/2003 | Baker ................ C03C 25/1065 385/128 |
| 2003/0215196 | A1 | * | 11/2003 | Bulters .............. G02B 6/02395 385/100 |
| 2004/0037521 | A1 | * | 2/2004 | Xiong .................. G02B 6/4482 385/103 |
| 2005/0207716 | A1 | * | 9/2005 | Konstadinidis ..... C03C 25/1065 385/127 |
| 2006/0062539 | A1 | * | 3/2006 | Bulters .............. G02B 6/02395 427/508 |
| 2007/0203258 | A1 | * | 8/2007 | Sugimoto .......... C08G 18/4854 523/160 |
| 2010/0058877 | A1 | * | 3/2010 | Bulters .............. G02B 6/02395 73/826 |
| 2010/0158469 | A1 | * | 6/2010 | Bulters .............. G02B 6/02395 427/513 |
| 2011/0038593 | A1 | * | 2/2011 | Chien ................ G02B 6/02395 385/141 |
| 2012/0207439 | A1 | * | 8/2012 | Okada .................. C03B 37/032 427/163.2 |
| 2013/0118208 | A1 | * | 5/2013 | Okada ................ C03C 25/1065 65/432 |
| 2016/0229734 | A1 | * | 8/2016 | Okada ................ C03B 37/0253 |
| 2016/0326275 | A1 | * | 11/2016 | Ashikaga ............... B05D 3/067 |
| 2016/0347646 | A1 | * | 12/2016 | Okada ................ G02B 6/02395 |
| 2018/0099894 | A1 | * | 4/2018 | Okada ................. C03B 37/032 |
| 2018/0171036 | A1 | * | 6/2018 | Ashikaga ................ B29B 13/08 |
| 2018/0282208 | A1 | | 10/2018 | Sato et al. |
| 2018/0305239 | A1 | * | 10/2018 | Okada .............. C03B 37/02718 |
| 2021/0032160 | A1 | * | 2/2021 | Bookbinder ........ C03C 25/1065 |

FOREIGN PATENT DOCUMENTS

| | | |
|---|---|---|
| JP | 2018-177630 A | 11/2018 |
| JP | 2019-064853 A | 4/2019 |

* cited by examiner

METHOD OF MANUFACTURING OPTICAL FIBER AND OPTICAL-FIBER-MANUFACTURING APPARATUS

CROSS REFERENCES TO RELATED APPLICATIONS

The present invention contains subject matter related to Japanese Patent Application No. 2021-110761 filed in the Japan Patent Office on Jul. 2, 2021, the entire contents of which are incorporated herein by reference.

BACKGROUND OF THE INVENTION

1. Field of the Invention

The present disclosure relates to a method of manufacturing an optical fiber and an optical-fiber-manufacturing apparatus.

2. Description of the Related Art

A glass fiber is acquired by drawing a preform the main component of which is quartz glass and which includes a core and a clad. A coating layer composed of resin is disposed on the outer circumference of the glass fiber in order to protect the glass fiber. For example, the coating layer includes a primary layer and a secondary layer that are laid on the primary layer. The material of the coating layer is a curable resin composition containing a photopolymerization initiator. The coating layer is formed by radiating ultraviolet rays to the curable resin composition and curing the curable resin composition (see, for example, Japanese Unexamined Patent Application Publication No. 2019-064853).

SUMMARY OF THE INVENTION

The manufacturing costs of an optical fiber need to be reduced. In a considered example of a method of reducing the costs, the output of radiation of the ultraviolet rays is decreased, and power consumption is reduced.

However, the reduction in the output of radiation results in insufficient curing of the curable resin composition, and the coating layer cannot satisfy characteristics required for protecting the glass fiber in some cases.

It is an object of the present disclosure to provide a technique for improving efficiency in curing a curable resin composition during manufacturing of an optical fiber even when the output of radiation is decreased.

According to an aspect of the present disclosure, there is a provided a method of manufacturing an optical fiber including applying a curable resin composition containing a photopolymerization initiator so that an outer circumference of a glass fiber including a core and a cladding is coated, and forming a coating layer by radiating an ultraviolet ray to the curable resin composition and curing the curable resin composition. Forming the coating layer includes providing two or more non-radiation periods and intermittently radiating the ultraviolet ray three or more times so that a total time of the non-radiation periods is 0.010 seconds or more.

According to another aspect of the present disclosure, there is a provided a method of manufacturing an optical fiber including applying a curable resin composition containing a photopolymerization initiator so that an outer circumference of a glass fiber including a core and a cladding is coated, and forming a coating layer by radiating an ultraviolet ray to the curable resin composition and curing the curable resin composition. Forming the coating layer includes providing a single non-radiation period and intermittently radiating the ultraviolet ray two times so that a time of the non-radiation period is 0.080 seconds or more.

According to another aspect of the present disclosure, there is a provided an optical-fiber-manufacturing apparatus configured to manufacture an optical fiber so that an outer circumference of a glass fiber including a core and a cladding is coated with a coating layer. The optical-fiber-manufacturing apparatus includes an application unit configured to apply a curable resin composition containing a photopolymerization initiator to the outer circumference of the glass fiber that passes through the application unit, and a plurality of ultraviolet radiation units configured to form the coating layer by radiating an ultraviolet ray to the curable resin composition applied so that the outer circumference of the glass fiber is coated and curing the curable resin composition. The plurality of ultraviolet radiation units are configured so that two or more non-radiation periods in which the ultraviolet ray is not radiated are provided until the curable resin composition is cured and so that the ultraviolet ray is intermittently radiated three or more times.

DESCRIPTION OF THE PREFERRED EMBODIMENTS

Description of Embodiment of Present Disclosure

Knowledge Acquired by Disclosers

Figure 1:
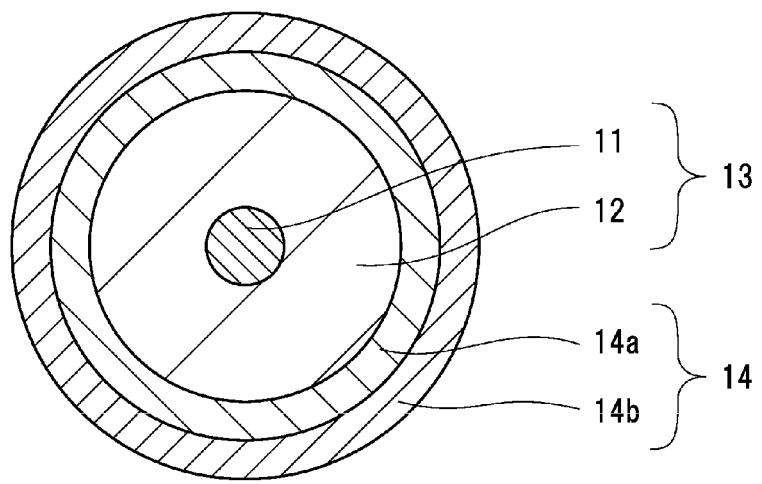
FIG. 1 is a sectional view schematically illustrating the structure of an optical fiber according to an embodiment of the present disclosure.

The summary of knowledge acquired by disclosers will now be described.

In the course of curing of a curable resin composition, radicals (initial radicals) that are generated from a photopolymerization initiator to which an ultraviolet ray is radiated react with resin molecules, radicals of the resin molecules (polymer radicals) react with each other, and resin molecular chains elongate. Typically, the ultraviolet ray is continuously radiated because radical reactions are continuously caused.

In some cases where the ultraviolet ray is continuously radiated, however, curing reactions described above do not efficiency proceed. It is thought that continuous radiation causes the initial radicals that are generated from the photopolymerization initiator and newly generated initial radicals to re-bonded to each other and causes the generated polymer radicals and the newly generated initial radicals to re-bonded to each other, the reactions between the polymer radicals do not proceed, and the curing reactions stop.

In view of these, the present inventors have found that intermittent radiation is preferable, that is, the ultraviolet ray is not continuously radiated, but the radiation is suspended after the ultraviolet ray is radiated, and the radiation is subsequently resumed.

The present disclosure is based on the above knowledge that the inventors have found.

In the following description, the initial radicals and the polymer radicals are simply referred to as radicals.

Embodiment of Present Disclosure

An embodiment of the present disclosure will now be listed and described.

(1) A method of manufacturing an optical fiber according to an aspect of the present disclosure includes applying a curable resin composition containing a photopolymerization initiator so that an outer circumference of a glass fiber including a core and a cladding is coated, and forming a coating layer by radiating an ultraviolet ray to the curable resin composition and curing the curable resin composition. Forming the coating layer includes providing two or more non-radiation periods and intermittently radiating the ultraviolet ray three or more times so that a total time of the non-radiation periods is 0.010 seconds or more.

With this feature, the curable resin composition can be efficiency cured by increasing the number of the non-radiation periods and increasing the number of times the ultraviolet ray is radiated.

(2) A method of manufacturing an optical fiber according to an aspect of the present disclosure includes applying a curable resin composition containing a photopolymerization initiator so that an outer circumference of a glass fiber including a core and a cladding is coated, and forming a coating layer by radiating an ultraviolet ray to the curable resin composition and curing the curable resin composition. Forming the coating layer includes providing a single non-radiation period between intermittent ultraviolet ray radiations, and a time of the single non-radiation period is 0.080 seconds or more.

With this feature, the curable resin composition can be efficiency cured by setting the time of the non-radiation period to a predetermined time even when the number of the non-radiation period is one.

(3) In the method described above in (1) or (2), applying the curable resin composition includes applying a second curable resin composition containing a photopolymerization initiator so that the second curable resin composition is laid on a first curable resin composition containing a photopolymerization initiator, forming the coating layer includes forming the coating layer which has a two-layer structure in which a secondary layer is laid on a primary layer, and the first curable resin composition contains 0.5 mass percent to 3.5 mass percent of the photopolymerization initiator.

With this feature, the curable resin composition can be sufficiently cured with the amount of the contained photopolymerization initiator being within the above range in the primary layer.

(4) In the method described above in (3), the Young's modulus of the primary layer at 23° C. is 0.40 MPa or more.

With this feature, the primary layer can be inhibited from having a void.

(5) An optical-fiber-manufacturing apparatus according to another aspect of the present disclosure is configured to manufacture an optical fiber in which an outer circumference of a glass fiber including a core and a cladding is coated with a coating layer. The optical-fiber-manufacturing apparatus includes an application unit configured to apply a curable resin composition containing a photopolymerization initiator to the outer circumference of the glass fiber that passes through the application unit, and a plurality of ultraviolet radiation units configured to form the coating layer by radiating an ultraviolet ray to the curable resin composition applied so that the outer circumference of the glass fiber is coated and curing the curable resin composition. The plurality of ultraviolet radiation units are configured so that two or more non-radiation periods in which the ultraviolet ray is not radiated are provided until the curable resin composition is cured and thereby the ultraviolet ray is intermittently radiated three or more times.

With this structure, the curable resin composition can be sufficiently cured.

(6) In the optical-fiber-manufacturing apparatus described above in (5), the plurality of ultraviolet radiation units are arranged at a predetermined interval in a passing direction along which the glass fiber passes in the apparatus, and the interval between the ultraviolet radiation units adjacent to each other and a passing speed of the glass fiber are adjusted so that the ultraviolet ray is to be intermittently radiated to the curable resin composition.

With this structure, the number of the non-radiation periods for the ultraviolet ray and the total time thereof can be appropriately changed.

(7) In the optical-fiber-manufacturing apparatus described above in (5), at least one of the plurality of ultraviolet radiation units includes an ultraviolet light-emitting diode and is configured to intermittently radiate the ultraviolet ray by pulse modulation.

With this structure, it is not necessary for the ultraviolet radiation units to be space from each other, and a space for the optical-fiber-manufacturing apparatus can be decreased.

Detail of Embodiment of Present Disclosure

An embodiment of the present disclosure will now be described with reference the drawings. The present disclosure is not limited to these examples, is shown by claims, and includes all modifications having the equivalent meaning and scope as those of the claims.

Embodiment of Present Disclosure

General Structure of Optical Fiber

An optical fiber that is manufactured according to the present embodiment will now be described with reference to FIG. 1. FIG. 1 is a sectional view schematically illustrating the structure of an optical fiber according to an embodiment of the present disclosure.

As illustrated in FIG. 1, an optical fiber 1 includes a glass fiber 13 that includes a core 11 and a cladding 12 and a coating layer 14 with which the outer circumference of the glass fiber 13 is coated and in which a secondary layer 14b is laid on a primary layer 14a.

Optical-Fiber-Manufacturing Apparatus

Figure 2:
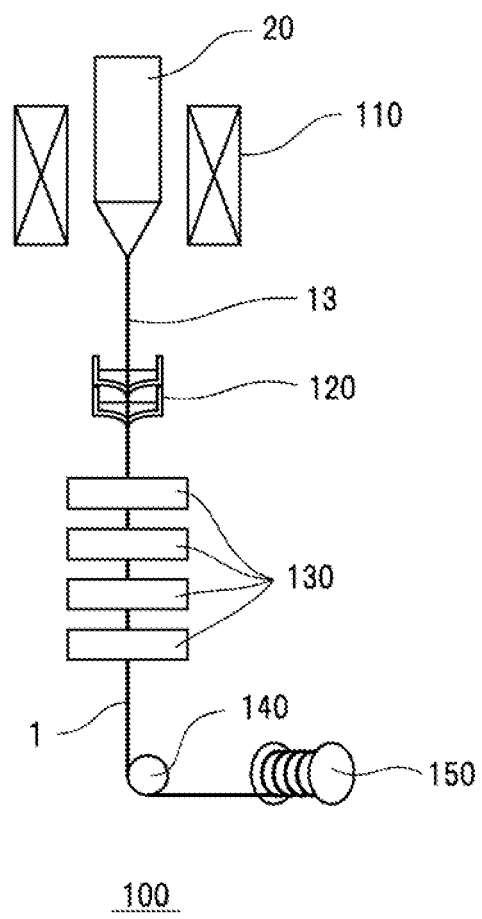
FIG. 2 schematically illustrates an optical-fiber-manufacturing apparatus according to an embodiment of the present disclosure.

An optical-fiber-manufacturing apparatus will now be described with reference to FIG. 2. FIG. 2 schematically illustrates an optical-fiber-manufacturing apparatus according to an embodiment of the present disclosure.

As illustrated in FIG. 2, an optical-fiber-manufacturing apparatus 100 includes at least a furnace 110, an application unit 120, ultraviolet radiation units 130, a guide roller 140, and a drum 150.

The ultraviolet radiation units 130 are arranged downstream of the application unit 120 in a passing direction along which the glass fiber 13 passes in the apparatus, and each ultraviolet radiation unit 130 radiates ultraviolet rays to a composition with which the surface of the glass fiber 13 is coated. The composition to which the ultraviolet rays are radiated is cured, the coating layer 14 is formed, and the optical fiber 1 is acquired. According to the present embodiment, the plurality of ultraviolet radiation units 130 are arranged at a predetermined interval in the passing direction. The interval between the ultraviolet radiation units 130 adjacent to each other is adjusted depending on, for example, the passing speed of the glass fiber 13 as described later. Examples of the ultraviolet radiation units 130 include an ultraviolet lamp and an ultraviolet light-emitting diode (an UV LED). The UV LED is preferable from the perspective of a reduction in power consumption. In FIG. 2, the number of the ultraviolet radiation units 130 is 4. However, the number is not particularly limited provided that the number is 2 or more.

The furnace 110, the application unit 120, the guide roller 140, and the drum 150 may have known structures.

Method of Manufacturing Optical Fiber

A method of manufacturing the optical fiber 1 by using the optical-fiber-manufacturing apparatus 100 described above will now be described.

An optical fiber preform 20 is placed in the furnace 110, heated, softened, and drawn, and consequently, the glass fiber 13 is formed. The glass fiber 13 that is formed by drawing includes the core 11 and the cladding 12 with which the circumference of the core 11 is coated.

Subsequently, the glass fiber 13 that is drawn is cooled as needed and is subsequently introduced into the application unit 120 that has a dual die structure. The application unit 120 contains a first curable resin composition (a first composition) for forming the primary layer 14*a* and a second curable resin composition (a second composition) for forming the secondary layer 14*b*. The glass fiber 13 passes through the application unit 120, and consequently, the first composition and the second composition are simultaneously applied so as to be laid in this order on the outer circumference of the glass fiber 13.

The first and second compositions are liquid compositions containing at least a resin component and a photopolymerization initiator. The kinds of the resin component and the photopolymerization initiator are appropriately selected for the first and second compositions depending on Young's modulus required for the primary layer 14*a* and the secondary layer 14*b*.

A known resin component can be used as the resin component, and a urethane (meth) acrylate oligomer or monomer, for example, can be used.

An example of the urethane (meth) acrylate oligomer is acquired by reacting polyol, polyisocyanate, and hydroxyl group containing (meth) acrylate. Examples of the polyol include polytetramethylene glycol, polypropylene glycol, and bisphenol A-ethylene oxide addition diol. Examples of the polyisocyanate include 2,4-tolylene diisocyanate, 2,6-tolylene diisocyanate, isophorone diisocyanate, and dicyclohexylmethane 4,4'-diisocyanate. Examples of the hydroxyl group containing (meth) acrylate include 2-hydroxyethyl acrylate, 2-hydroxybutyl acrylate, 1,6-hexanediol monoacrylate, pentaerythritol triacrylate, and 2-hydroxypropyl acrylate.

A known monomer can be used as the monomer, and a monofunctional monomer having a single polymerizable group and a polyfunctional monomer having two or more polymerizable groups can be used. As for the monomer, one kind can be used alone, or two or more kinds can be used.

The photopolymerization initiator can be appropriately selected from known radical photopolymerization initiators. Examples thereof include 1-hydroxycyclohexyl phenyl ketone (Irgacure 184 made by BASF SE), 2,2-dimethoxy-2-phenylacetophenone, 1-(4-isopropylphenyl)-2-hydroxy-2-methylpropane-1-one, 2,4,4-trimethylpentylphosphine oxide, 2,4,4-trimethylbenzoyldiphenylphosphine oxide, 2-methyl-1-[4-(methylthio)phenyl]-2-morpholino-propane-1-one (Irgacure 907 made by BASF SE), 2,4,6-trimethylbenzoyldiphenylphosphine oxide (Irgacure TPO made by BASF SE), and bis(2,4,6-trimethylbenzoyl)phenylphosphine oxide (Irgacure 819 made by BASF SE). As for the photopolymerization initiator, one kind of these may be used alone, or two or more kinds may be used.

The amount of the contained photopolymerization initiator is not particularly limited. According to the present embodiment, the radicals can be inhibited from being re-bonded to each other, and accordingly, the Young's modulus of the coating layer 14 can be sufficient even when the amount of the contained photopolymerization initiator is decreased. For example, as for the first composition and the second composition for forming the primary layer 14*a* and the secondary layer 14*b*, the amount of the contained photopolymerization initiator is preferably 0.5 mass percent to 3.5 mass percent. From the perspective that the Young's modulus of the primary layer 14*a* at 23° C. is 0.40 MPa or more, the amount of the contained photopolymerization initiator is preferably 0.5 mass percent to 1.5 mass percent as described in detail later. The Young's modulus in this range achieves the desired high degree of curing even when the amount of the contained photopolymerization initiator is decreased. Manufacturing costs can be reduced by decreasing the amount of the contained photopolymerization initiator.

The first and second compositions may contain another additive other than the components described above as needed. Examples of the other additive include a silane coupling agent, a photoacid generator, a leveling agent, a defoaming agent, and an antioxidant.

The thicknesses of the first composition and the second composition that are applied are appropriately changed depending on thickness required for the primary layer 14*a* and the secondary layer 14*b* of the optical fiber 1.

Subsequently, the glass fiber 13 after the compositions are applied to the surface is introduced into the plurality of ultraviolet radiation units 130 from the application unit 120 by being run. According to the present embodiment, the glass fiber 13 passes through the plurality of ultraviolet radiation units 130 that are arranged at a predetermined interval in the passing direction thereof, the ultraviolet rays are consequently radiated to the compositions that are applied to the surface of the glass fiber 13, and the compositions are cured. In this way, the optical fiber 1 is acquired.

According to the present embodiment, one or more non-radiation periods in which the ultraviolet rays are not radiated are provided when the ultraviolet rays are radiated so that the radicals that are generated by the ultraviolet rays are inhibited from being re-bonded to each other, and the ultraviolet rays are intermittently radiated two or more times. Specifically, the ultraviolet radiation units 130 radiate the ultraviolet rays while the glass fiber 13 passes through the plurality of ultraviolet radiation units 130, the ultraviolet rays are not radiated at positions between the ultraviolet radiation units 130 adjacent to each other so that the radiation of the ultraviolet rays and non-radiation alternately continue. In this way, the ultraviolet rays are not continuously radiated to the compositions. In FIG. 2, three non-radiation periods are provided between the four ultraviolet radiation units 130 that radiate the ultraviolet rays.

When the curable resin compositions are cured, the non-radiation periods for the ultraviolet rays are provided, and the ultraviolet rays are intermittently radiated as described above. Consequently, the generated radicals and newly generated radicals are inhibited from being re-bonded to each other, and the curing reactions of the curable resin compositions can efficiency proceed. For this reason, a high degree of curing of the coating layer 14 can be achieved by the alternately continuing the radiation of the ultraviolet rays and the non-radiation even in the case where the output (for example, power consumption for a light source that shines) of the radiation of the ultraviolet rays is decreased.

The time of the non-radiation periods is a time from the radiation of one of the ultraviolet radiation units to the radiation of the ultraviolet radiation unit adjacent thereto. In the case where the number of the non-radiation periods are two or more, the time is the total time thereof. The time of the non-radiation periods can be adjusted by appropriately changing the interval (distance) between the ultraviolet radiation units 130 adjacent to each other and the passing speed of the glass fiber 13. For example, the time of the non-radiation periods can be adjusted by increasing the distance between the ultraviolet radiation units 130 depending on the passing speed or decreasing the passing speed depending on the distance between the ultraviolet radiation units 130.

The time of the non-radiation periods is not particularly limited provided that radicals that are generated by radiation and radicals that are newly generated by the radiation of the adjacent ultraviolet radiation unit 130 can be inhibited from being re-bonded to each other. For example, in the case where two or more non-radiation periods are provided until the compositions are cured, and the ultraviolet rays are radiated three or more times, the total time of the non-radiation periods is preferably 0.010 seconds or more, more preferably 0.026 seconds or more. The upper limit is not particularly limited but is preferably, for example, three seconds or less from the perspective of manufacturing efficiency. For example, in the case where a single non-radiation period is provided until the compositions are cured, and the ultraviolet rays are radiated two times, the time of the non-radiation period between intermittent ultraviolet ray radiation is preferably 0.080 seconds or more. The upper limit is not particularly limited but is preferably, for example, three seconds or less from the perspective of the manufacturing efficiency. When the non-radiation period or periods are within the above range, the curable resin compositions can be sufficiently cured even in the case where the output of the radiation of the ultraviolet rays is decreased. Reaction inhibition due to re-bonded radicals can be reduced with certainty by increasing the number of the non-radiation periods, and the curable resin compositions can be sufficiently cured.

The total time of the radiation of the plurality of ultraviolet radiation units 130 is not particularly limited provided that the primary layer 14a and the secondary layer 14b can be cured so as to have a high degree of curing. For example, the total time of the radiation is preferably 0.015 seconds to 0.12 seconds. From the perspective that the radicals are inhibited from being re-bonded to each other and that the manufacturing efficiency is kept high, a ratio between the total time of the radiation and the total time of the non-radiation periods is preferably 1:8 to 8:1.

Finally, the optical fiber 1 that passes through the ultraviolet radiation units 130 and that is manufactured is wound around the drum 150 by using the guide roller 140.

The primary layer 14a and the secondary layer 14b of the optical fiber 1 to be acquired are formed by intermittent radiation of the ultraviolet rays so as to have a high degree of curing, and accordingly, the Young's moduli thereof are high. Specifically, the Young's modulus of the primary layer 14a is preferably 0.40 MPa or more, and the Young's modulus of the secondary layer 14b is preferably 850 MPa or more. When the Young's modulus of the primary layer 14a is within the above range, the primary layer 14a can be inhibited from having a void even in the case where a heat cycle is applied to the optical fiber 1. This reduces a transmission loss due to the heat cycle in the optical fiber 1 and enables high transmission characteristics to be maintained. The void means a gap that is formed by separating the primary layer 14a from the glass fiber 13 due to the heat cycle.

Another Embodiment of Present Disclosure

The embodiment of the present disclosure is specifically described above. The present disclosure, however, is not limited to the embodiment described above and can be modified in various ways without departing from the sprit thereof.

In the description according to the above embodiment, the distance between the ultraviolet radiation units 130 and the passing speed of the glass fiber 13 are adjusted to provide the non-radiation period or periods for the ultraviolet rays, but the present disclosure is not limited thereto. For example, at least one of the plurality of ultraviolet radiation units 130 may be a UV LED for the intermittent radiation by using pulse modulation lighting. The pulse modulation lighting enables the distance between the ultraviolet radiation units 130 for the non-radiation to be unnecessary and enables an installation space to be small.

According to the embodiment described above, the coating layer 14 has the two-layer structure of the primary layer 14a and the secondary layer 14b, but the present disclosure is not limited thereto. The coating layer 14 may have a single layer structure.

Example

An example according to the present disclosure will now be described. The example corresponds to an example of the present disclosure, and the present disclosure is not limited to the example.

In the present example, optical fibers each including the coating layer having the two-layer structure of the primary layer and the secondary layer illustrated in FIG. 1 were manufactured while the number of the non-radiation periods and the total time thereof were changed.

Manufacturing of Optical Fiber

The first curable resin composition for forming the primary layer and the second curable resin composition for forming the secondary layer that were first prepared contained urethane methacrylate as the main component and 1.0 mass percent of the photopolymerization initiator.

Subsequently, an optical fiber preform was heated, softened, and drawn in a furnace, and a glass fiber having a diameter of 125 μm was consequently formed.

The glass fiber was introduced into the application unit having the dual die structure by being run, and the first curable resin composition and the second curable resin composition were applied so as to be laid in this order on the surface of the glass fiber.

Subsequently, the glass fiber to which the curable resin compositions were applied was introduced into a plurality of ultraviolet radiators (UV LEDs) that were arranged along the passing direction and passed therethrough, and the ultraviolet rays were radiated to the curable resin compositions. For samples 1 to 10, the passing speed of the glass fiber, the number of the UV LEDs, and the distance between the UV LEDs adjacent to each other were appropriately adjusted for the radiation so that the number of the non-radiation periods and the total time thereof were changed as illustrated in Table 1 described later. The curable resin compositions to which the ultraviolet rays were radiated were cured, and the optical fibers of the samples 1 to 10 were manufactured. As for each optical fiber, the thickness of the primary layer was 20 μm, the thickness of the secondary layer was 12.5 μm, and the thickness of the coating layer including these was 32.5 μm. As for each UV LED, the output (the amount of energy) of the radiated ultraviolet rays was 90%. Each non-radiation period was provided so that the total time of the radiation of the ultraviolet rays was equally 0.03 seconds for each sample.

TABLE 1

|  | Total Time of Non-radiation Period [second] | Number of Non-radiation Period | Young's modulus of Primary Layer [MPa] | Young's modulus of Secondary Layer [MPa] | Heat Cycle Test |
|---|---|---|---|---|---|
| Sample 1 | 0.010 | 2 | 0.43 | 850 | B |
| Sample 2 | 0.026 | 2 | 0.49 | 874 | A |
| Sample 3 | 0.026 | 3 | 0.53 | 887 | A |
| Sample 4 | 0.026 | 4 | 0.52 | 911 | A |
| Sample 5 | 0.080 | 2 | 0.54 | 908 | A |
| Sample 6 | 0.080 | 1 | 0.46 | 856 | B |
| Sample 7 | 0.000 | — | 0.26 | 744 | C |
| Sample 8 | 0.005 | 2 | 0.31 | 821 | C |
| Sample 9 | 0.010 | 1 | 0.36 | 832 | C |
| Sample 10 | 0.070 | 1 | 0.38 | 843 | C |

Evaluation

As for the acquired optical fibers, the Young's moduli of the primary layer and the secondary layer and resistance (heat cycle characteristics) when a heat cycle was applied were evaluated. Evaluation methods will now be described.

Young's Modulus

The Young's moduli of the primary layer and the secondary layer were measured as follows.

The Young's modulus of the primary layer was measured by a Pullout Modulus test at 23° C. Specifically, a cut is made in the coating layer of each optical fiber by, for example, a razor, the coating layer was cut, and the glass fiber was extracted with the coating layer (the primary layer and the secondary layer) fixed. Subsequently, the Young's modulus of the primary layer at 23° C. was calculated by using the amount of elastic deformation of the primary layer before the glass fiber was extracted and the stress of the primary layer acquired by using the tensile force of the glass fiber.

As for the secondary layer, the optical fiber was immersed into a mixed solvent of acetone and ethanol, and only the coating layer was extracted into a tubular shape. Subsequently, the solvent was removed by vacuum drying, and a tensile test (tensile speed was 1 mm/min) was conducted in a constant temperature chamber at 23° C. The Young's modulus of the coating layer was calculated by using a secant equation of 2.5% strain. The Young's modulus thus acquired can be thought to be substantially the Young's modulus of the secondary layer.

Heat Cycle Characteristics

The manufactured optical fibers were heated in 50 cycles at −40° C. to 23° C. (were left for an hour at each temperature where transition time was 60 minutes), the transmission characteristics of signal light at a wavelength of 1550 nm were measured in temperature conditions of 23° C. and −40° C., and the transmission losses were acquired at 23° C. and −40° C. When a difference in transmission losses between the transmission loss at −40° C. and the transmission loss at 23° C. was less than 0 dB/km (the transmission loss at −40° C. is smaller), the result of the evaluation was A, when the difference was no less than 0 dB/km and less than 0.01 dB/km, the result of the evaluation was B, and when the difference was 0.01 dB/km or more, the result of the evaluation was C. According to the present example, the transmission loss was small, and heat cycle resistance was excellent when the evaluation was A or B.

Result of Evaluation

The result of the evaluation is illustrated in Table 1.

As for the samples 1 to 6, as illustrated in Table 1, it is confirmed that the curable resin compositions can be efficiency cured, the Young's modulus of the primary layer can be increased to 0.40 MPa or more, and the Young's modulus of the secondary layer can be increased to 850 MPa or more because each non-radiation period is provided so that the radicals can be inhibited from being re-bonded to each other, and the ultraviolet rays are intermittently radiated. It is also confirmed that since the Young's moduli are high, the transmission loss is small in the heat cycle test, and the heat cycle resistance is high.

In contrast, as for the sample 7, it is confirmed that the Young's moduli of the primary layer and the secondary layer are lower than those of the samples 1 to 6, and the heat cycle resistance decreases because no non-radiation periods are provided, and the ultraviolet rays are continuously radiated to the curable resin compositions. The reason is presumably that the radicals are re-bonded to each other during the radiation, and the curing reactions do not efficiency proceed.

As for the samples 8 to 10, the Young's moduli are low as in the sample 7, and the heat cycle resistance decreases because it does not take sufficient time for inhibiting the radicals from being re-bonded to each other although the non-radiation period or periods are provided.

In comparison among the samples 1, 2, and 8, it is confirmed that in the case where the number of the non-radiation periods are two or more, the total time thereof is preferably 0.010 seconds or more, more preferably 0.020 seconds or more from the perspective that the curing reactions efficiency proceed. In comparison between the samples 6 and 10, it is confirmed that even in the case where the number of the non-radiation period is one, when the time thereof is 0.080 seconds or more, the curing reactions can efficiency proceed, and the Young's moduli can be high. In the case where the number of the non-radiation periods is two or more, the reason why the duration of the non-radiation can be shorter than that in the case where the number of the non-radiation period is one is presumably that the increase in the number of the non-radiation periods enables the number of times the radicals are inhibited from being re-bonded to each other to be increased and enables the curing reactions to more efficiency proceed.

In comparison among the samples 2 to 4, it is confirmed that even when the total time of the non-radiation periods is the same, the increase in the number of the non-radiation periods enables the curing reactions to more efficiency proceed.

As for the samples 1 to 6, it is confirmed that the Young's modulus of the primary layer can be increased to 0.4 MPa or more even when the amount of the photopolymerization initiator that is contained in the primary layer is decreased to 1 mass percent.

Figure 3:
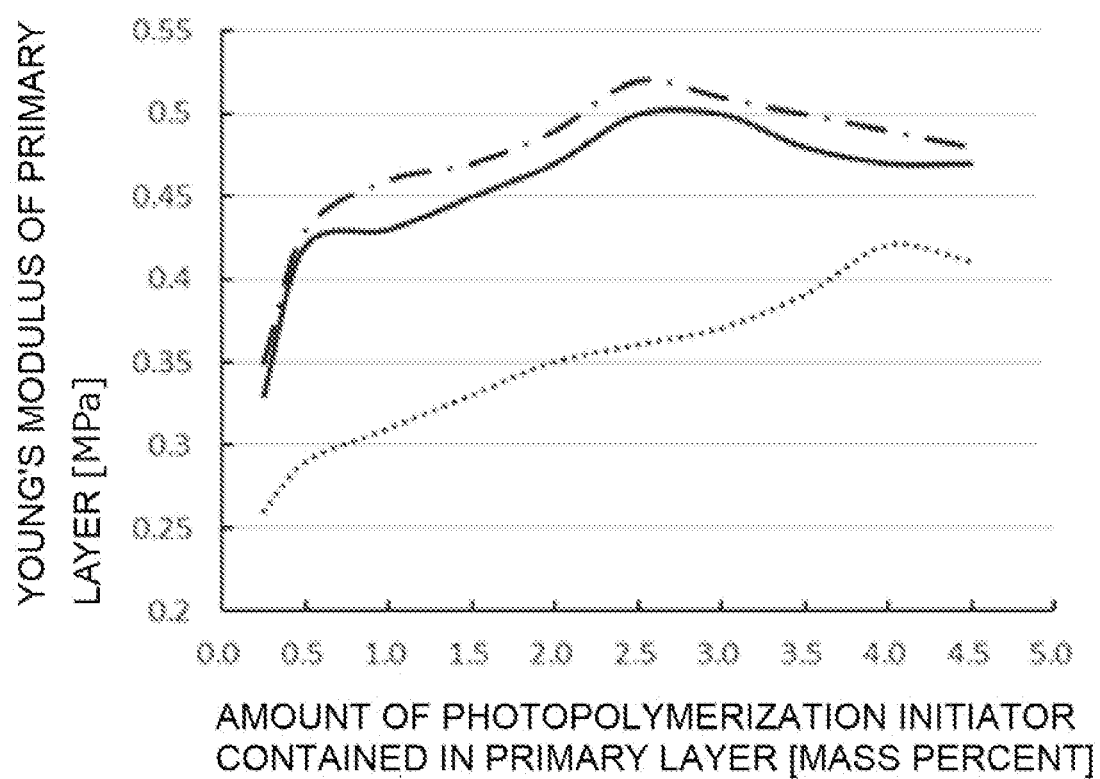
FIG. 3 is a graph for description of a correlation between the amount of a contained photopolymerization initiator and the Young's modulus of a primary layer.

A correlation between the amount of the contained photopolymerization initiator and the Young's modulus of the primary layer will be described with reference to FIG. 3. FIG. 3 is a graph for description of the correlation between the amount of the contained photopolymerization initiator and the Young's modulus of the primary layer. In FIG. 3, a solid line, a one-dot chain line, and a dashed line represent variations in the Young's modulus of the primary layer of the sample 1 described above when the amount of the photopolymerization initiator that is contained in the primary layer is changed in radiation conditions described later. The solid line represents the correlation when the number of the non-radiation periods is two, the total time of the non-radiation periods is 0.01 seconds, and the total time of the radiation is 0.03 seconds. The one-dot chain line represents the correlation when the number of the non-radiation period is one, the time of the non-radiation period is 0.08 seconds, and the time of the radiation is 0.03 seconds. The dashed line represents the correlation when no non-radiation periods are provided, and the ultraviolet rays are continuously radiated for 0.03 seconds.

As illustrated in FIG. 3, in the case of the continuous radiation, it is necessary for the amount of the contained photopolymerization initiator to be 4.0 mass percent or more in order to increase the Young's modulus of the primary layer to, for example, 0.4 MPa or more. In the case of the intermittent radiation with the non-radiation period or periods, it is confirmed that the Young's modulus can be increased to 0.4 MPa or more even when the amount of the contained photopolymerization initiator is 0.5 mass percent to 3.5 mass percent. It is also confirmed that the Young's modulus can be increased to 0.45 MPa or more when the amount of the contained photopolymerization initiator is 1.5 mass percent to 3.5 mass percent. It is confirmed from this that the radicals can be inhibited from being re-bonded to each other, and the curing reactions can efficiency proceed by providing the non-radiation period or periods, and accordingly, the sufficient Young's moduli can be acquired even when the amount of the contained photopolymerization initiator is decreased.

As described above, when the optical fiber is manufactured, the non-radiation period or periods in which the ultraviolet rays are not radiated to the curable resin compositions are provided, and the ultraviolet rays are intermittently radiated. This inhibits the radicals from being re-bonded to each other and enables the coating layer to have the high degree of curing even when the output of the ultraviolet rays is decreased.

What is claimed is:

1. A method of manufacturing an optical fiber, the method comprising:
    applying a curable resin composition containing a photopolymerization initiator so that an outer circumference of a glass fiber including a core and a cladding is coated; and
    forming a coating layer by radiating an ultraviolet ray to the curable resin composition and curing the curable resin composition,
    wherein forming the coating layer includes providing four or more non-radiation periods and intermittently radiating the ultraviolet ray five or more times so that a total time of the non-radiation periods is 0.026 seconds or more and 3 seconds or less.

2. The method according to claim 1,
    wherein applying the curable resin composition includes applying a second curable resin composition containing a photopolymerization initiator so that the second curable resin composition is laid on a first curable resin composition containing a photopolymerization initiator,
    wherein forming the coating layer includes forming the coating layer which has a two-layer structure in which a secondary layer is laid on a primary layer, and
    wherein the first curable resin composition contains 0.5 mass percent to 3.5 mass percent of the photopolymerization initiator.

3. The method according to claim 2,
    wherein a Young's modulus of the primary layer at 23° C. is 0.40 MPa or more.

4. The method according to claim 1,
    wherein a total time of radiating the ultraviolet ray is 0.015 seconds to 0.12 seconds.

* * * * *